Patented June 27, 1950

2,512,624

UNITED STATES PATENT OFFICE 2,512,624

TREATMENT OF TRIAZOLE POLYMERS

James Wotherspoon Fisher, Harold Bates, and Edward William Wheatley, Spondon, near Derby, England, assignors to Celanese Corporation of America, a corporation of Delaware No Drawing. Application October 8, 1946, Serial No. 702,061. In Great Britain October 12, 1945

8 Claims. (Cl. 260—2)

This invention relates to improvements in the production and treatment of polymers.

In U. S. applications S. Nos. 662,628 and 609,031, filed April 16, 1946, and August 4, 1945, respectively, there is described a new series of polymers characterised by containing in its structural unit the triazole ring, and specifically the 1.2.4-triazole ring. The specifications further describe polymers containing the 4-amino-1.2.4-triazole nucleus. A number of methods of making such polymers are described in the specifications. Further, the specifications indicate that the linear polymers so produced, if of sufficiently high molecular weight, may be formed into films or spun into filaments. The said specifications indicate that these new polymers, unlike the known nitrogen-containing polymers which are polyamides, are extraordinarily resistant to hydrolysis. Indeed, it is possible to boil them with dilute or concentrated hydrochloric acid without any break-down of the polymer.

The said specifications further indicate that unless precautions are taken during the polymerisation there is a tendency for resinification to take place, that is to say a tendency for the polymers to become infusible and insoluble, possibly by cross-linking or some other side reaction. As indicated in the specifications, the presence of water, at least during the initial stages of the condensation, does much to retard this tendency.

We have now found that polymers which contain triazole rings in their structural units and which have become resinified or contain products of resinification can be restored to the fusible state and freed from products of resinification by applying a hydrolysing treatment. For instance, we may treat the resinified polymer with steam or water at high temperature or with acids or other agents which can split acid amide groups in order to restore the linearity of the polymer. This is a very important observation, since it enables one to work up again polymers which have become resinified accidentally, and moreover it avoids the necessity for taking strict precautions to avoid resinification during the polymerisation. As stated in the above specifications and in U. S. application S. No. 672,332, filed May 25, 1946, now Patent 2,476,968 July 26, 1949 the triazole nucleus itself is extraordinarily resistant to hydrolysing agencies, for example steam or water even under pressure or dilute or concentrated hydrochloric acid. It is clear, therefore, that in the present process of restoring the resinified polymers to the soluble fusible state, the triazole ring itself is not split. This suggests that the infusibility is due to reaction between residual carboxylic groups in the linear polymer and either the amino groups of aminotriazole rings or the nitrogen atoms carrying a hydrogen atom in triazole rings.

The treatment according to the invention may be applied to polymers which develop evidence of resinification before or after attaining the desired chain length e. g. that necessary for filament-forming, and these polymers, after subjection to the treatment, may then be further polymerised if desired. Alternatively, if polymers have been formed under conditions which produce both triazole rings and hydrazide or other hydrolysable links in their chains, the hydrolysable links may be split by treatment according to the invention and the residues further polymerised. Such further polymerisation may be effected by heating in the presence of ammonia, hydrazine and/or their monosubstitution products, e. g. under the heating conditions described in U. S. application S. No. 662,628, filed April 16, 1946.

The invention is applicable to polymers produced by any of the processes described in the above specifications or by equivalent processes whether they have been resinified to the extent of being completely infusible and insoluble in solvents such as phenolic bodies or formic acid, or whether the resinification process by which infusibility and insolubility arises has only just started.

The process of the invention may be also applied to waste filamentary material produced from polymers containing triazole rings in their structural units or to other shaped material produced from such polymers in order to ensure that the material is free from products of resinification and to convert the material into a consolidated form suitable for melt spinning or other shaping operation applied to molten polymer.

The preferred hydrolysing agent for use according to the invention is steam or hot water, preferably applied at temperatures above 100° C., especially at about 150–200° C. Temperatures in excess of 200° C. are found to tend to split off the amino groups of aminotriazole rings and may therefore be undesirable in treating polymers containing such rings. Lower temperatures may, however, be employed, but the duration of the treatment may have to be considerably prolonged. The temperatures and times of treatments with other hydrolysing agents e. g.

3 acids, will depend upon the strength of the agent employed.

The invention is illustrated by the following examples in which intrinsic viscosity is measured in a 1% solution of the polymer in m-cresol:

Example 1

An infusible polymer produced by heating sebacic dihydrazide is heated in an autoclave with twice its weight of water at 240° C. for 3 hours, the maximum pressure being 500 lb./sq. in. The product is a hard tough, opaque mass, soluble in phenolic solvents and in formic acid and methanol, and insoluble in water and acetone, and is capable of forming long fine filaments; its melting point is 210–214° C. and its intrinsic viscosity 0.45.

Example 2

The same infusible polymer is refluxed with an excess of concentrated hydrochloric acid. The polymer rapidly disintegrates and forms a viscous pale yellow oil. This is separated off and the oil, which is the hydrochloride of the polyaminotriazole, is treated to regenerate the linear polymer by addition of alkali. Again the product is insoluble in water and acetone, soluble in methanol, cresol and formic acid, and is capable of forming long fine filaments; its melting point is 210° C. and its intrinsic viscosity 0.43.

Example 3

Example 1 is repeated with a polymer formed from sebacic dihydrazide which is only just started to resinify, the mixture of the polymer in water being heated for 3 hours at 200° C. and a maximum pressure of 200 lb./sq.in. The product has substantially the same properties as those of the product of Example 1.

Example 4

The partially resinified polymer of Example 3 is heated with 1½ times its weight of water in an autoclave for 3 hours at 150° C. and a maximum pressure of 60 lb./sq.in. Again the polymer is restored to the fusible soluble state and has good fibre-forming properties; its melting point is 204° C. and its intrinsic viscosity 0.49.

Example 5

Waste yarn produced by melt spinning a polymer produced by heating sebacic dihydrazide is heated with half its weight in water in an autoclave for 2 hours at 200° C. and 220 lb./sq.in. pressure. The product is a light coloured block of fusible polymer, insoluble in methanol and having good fibre-forming properties.

Having described our invention, what we desire to secure by Letters Patent is:

1. Process for the treatment of polymers containing 4-amino-1.2.4-triazole rings in their structural units and which are obtained by heating a reaction mass which on hydrolysis yields a mixture of hydrazine and a dicarboxylic acid free from reactive groups other than the two carboxylic groups, the quantity of hydrazine being sufficiently more than two moles for each mole of dicarboxylic acid to produce a soluble and fusible linear polymer resistant to hydrolysis by hydrochloric acid, which polymers have by heat treatment been rendered insoluble and infusible, which comprises heating the said insoluble and infusible polymers with a hydrolyzing agent selected from the group consisting of water and hydrochloric acid until the insoluble and infusible polymer is rendered completely soluble and fusible.

2. Process for the treatment of polymers containing 4-amino-1.2.4-triazole rings in their structural units and which are obtained by heating a reaction mass which on hydrolysis yields a mixture of hydrazine and a dicarboxylic acid free from reactive groups other than the two carboxylic groups, the quantity of hydrazine being sufficiently more than two moles for each mole of dicarboxylic acid to produce a soluble and fusible linear polymer resistant to hydrolysis by hydrochloric acid, which polymers have by heat treatment been rendered insoluble and infusible, which comprises heating the said insoluble and infusible polymers with water at a temperature above 100° C. until the insoluble and infusible polymer is rendered completely soluble and fusible.

3. Process for the treatment of polymers containing 4-amino-1.2.4-triazole rings in their structural units and which are obtained by heating a reaction mass which on hydrolysis yields a mixture of hydrazine and a dicarboxylic acid free from reactive groups other than the two carboxylic groups, the quantity of hydrazine being sufficiently more than two moles for each mole of dicarboxylic acid to produce a soluble and fusible linear polymer resistant to hydrolysis by hydrochloric acid, which polymers have by heat treatment been rendered insoluble and infusible, which comprises heating the said insoluble and infusible polymers with liquid water at a temperature of 150 to 200° C. until the insoluble and infusible polymer is rendered completely soluble and fusible.

4. Process for the treatment of polymers containing 4-amino-1.2.4-triazole rings in their structural units and which are obtained by heating a reaction mass which on hydrolysis yields a mixture of hydrazine and a dicarboxylic acid free from reactive groups other than the two carboxylic groups, the quantity of hydrazine being sufficiently more than two moles for each mole of dicarboxylic acid to produce a soluble and fusible linear polymer resistant to hydrolysis by hydrochloric acid, which polymers have by heat treatment been rendered insoluble and infusible, which comprises heating the said insoluble and infusible polymers with steam at a temperature of 150 to 200° C. until the insoluble and infusible polymer is rendered completely soluble and fusible.

5. Process for the treatment of polymers containing 4-amino-1.2.4-triazole rings in their structural units and which are obtained by heating dihydrazides of a dicarboxylic acid free from reactive groups other than the two carboxylic groups in the presence of sufficient hydrazine to produce a soluble and fusible linear polymer resistant to hydrolysis by hydrochloric acid, which polymers have by heat treatment been rendered insoluble and infusible, which comprises heating the said insoluble and infusible polymers with a hydrolyzing agent selected from the group consisting of water and hydrochloric acid until the insoluble and infusible polymer is rendered completely soluble and fusible.

6. Process for the treatment of polymers containing 4-amino-1.2.4-triazole rings in their structural units and which are obtained by heating dihydrazides of a dicarboxylic acid free from reactive groups other than the two carboxylic groups in the presence of sufficient hydrazine to produce a soluble and fusible linear polymer resistant to hydrolysis by hydrochloric acid, which polymers have by heat treatment been rendered insoluble and infusible, which comprises heating the said insoluble and infusible polymers with water at a temperature above 100° C. until the insoluble and infusible polymer is rendered completely soluble and fusible.

7. Process for the treatment of polymers containing 4-amino-1.2.4-triazole rings in their structural units and which are obtained by heating dihydrazides of a dicarboxylic acid free from reactive groups other than the two carboxylic groups in the presence of sufficient hydrazine to produce a soluble and fusible linear polymer resistant to hydrolysis by hydrochloric acid, which polymers have by heat treatment been rendered insoluble and infusible, which comprises heating the said insoluble and infusible polymers with liquid water at a temperature of 150 to 200° C. until the insoluble and infusible polymer is rendered completely soluble and fusible.

8. Process for the treatment of polymers containing 4-amino-1.2.4-triazole rings in their structural units and which are obtained by heating dihydrazides of a dicarboxylic acid free from reactive groups other than the two carboxylic groups in the presence of sufficient hydrazine to produce a soluble and fusible linear polymer resistant to hydrolysis by hydrochloric acid, which polymers have by heat treatment been rendered insoluble and infusible, which comprises heating the said insoluble and infusible polymers with steam at a temperature of 150 to 200° C. until the insoluble and infusible polymer is rendered completely soluble and fusible.

JAMES WOTHERSPOON FISHER.
HAROLD BATES.
EDWARD WILLIAM WHEATLEY.

REFERENCES CITED

The following references are of record in the file of this patent:

UNITED STATES PATENTS

| Number | Name | Date |
| --- | --- | --- |
| 2,395,642 | Prichard | Feb. 26, 1946 |